INVENTOR
STANLEY G. HARTZ
BY Stryker and Jacobson
ATTORNEYS

July 15, 1969 S. G. HARTZ 3,456,118
CARRIAGE WITH MOVABLE CO-PLANAR FRAMES FOR POSITIONING
TEST DEVICES WITH RESPECT TO CONTINUOUSLY
MOVING STRIP OF METAL
Filed July 30, 1965 3 Sheets-Sheet 2

INVENTOR
STANLEY G. HARTZ
BY Stryker and Jacobson
ATTORNEYS

INVENTOR
STANLEY G. HARTZ
BY Stryker and Jacobson
ATTORNEYS

United States Patent Office 3,456,118
Patented July 15, 1969

3,456,118
CARRIAGE WITH MOVABLE CO-PLANAR FRAMES FOR POSITIONING TEST DEVICES WITH RESPECT TO CONTINUOUSLY MOVING STRIP OF METAL
Stanley G. Hartz, Minneapolis, Minn., assignor, by mesne assignments, to Buckbee-Mears Company, St. Paul, Minn., a corporation of Minnesota
Filed July 30, 1965, Ser. No. 476,120
Int. Cl. H01j 5/16
U.S. Cl. 250—235            6 Claims

ABSTRACT OF THE DISCLOSURE

A movable carriage made up of a pair of planar frames, is mounted in a main support stand in a plane parallel to a continuously moving wide strip or webbing of metal. The metal contains translucent patterned areas which must be tested for accuracy. As the metal webbing is continuously moving downstream the carriage is driven in the opposite direction until a sensing device such as a photoelectric cell, carried on one of the frames, detects the presence of a longitudinal locating index on the metal webbing which causes the driving means to be de-energized and the carriage to be clamped onto the metal strip to travel with the metal. At that time an inner frame is moved across the webbing until a transverse locating index on the metal is detected by another sensing device and the inner frame is locked in this position so that still other testing devices such additional photocells carried by the frames, can be operated to see that the translucent pattern is correct. When the carriage meets the limit of its downstream travel it is unclamped from the metal webbing and again driven back upstream to catch the next available test area.

---

This invention relates generally to the field of test equipment and in particular relates to apparatus for use in the inspection testing of a continuously moving webbing after it has been at least partially processed.

The following is a list of patents and patent applications which describe various methods and apparatus for processing webbing to produce a variety of precision articles: Patents issued to Norman B. Mears Nos. 2,720,146; 2,751,829; 2,762,149 and 2,786,443, and patent applications of Norman B. Mears assigned to the same assignee as the instant application, Ser. No. 388,077, filed Aug. 7, 1964, now Patent 3,313,225 dated April 11, 1967 and No. 433,950 filed Feb. 19, 1965, now Patent 3,385,745 dated May 28, 1968.

Some of the inventions are described in the above-listed patents and patent applications as they are used in the production of television picture tube aperture masks from a continuous sheet of metallic webbing. The foregoing patents and applications are not listed here as being illustrative of the prior art, but merely as references which provide some insight to the environment of the present invention. Although neither the instant invention nor the foregoing listed ones are limited to use in the production of aperture masks, the present invention will be described in the same environment in order to point out most clearly the features and advantages of the invention.

Most of the above-listed inventions and others of a similar nature have been directed toward improving and facilitating the mass production of these precision articles. The instant invention differs somewhat since it is principally concerned with the inspection testing of the webbing or the articles produced from the webbing. Although the invention will be described as it is used for inspecting and testing the finished end product, it should be understood that it may be utilized just as effectively elsewhere in the manufacturing process with its accompanying features and advantages to maintain quality control of the various processing steps.

As stated earlier, the invention will be described and its advantages and features pointed out with relation to its particular use in the inspection testing of TV aperture masks which are fabricated from metallic webbing. As described in the copending patent application by Norman B. Mears Ser. No. 388,077, supra, the aperture masks contain a multitude of miniature holes which are etched through the metallic webbing in a predetermined pattern by photoprinting and etching techniques. In order to produce these articles with the required precision but at an economical rate, they are mass produced by moving the webbing continuously through each of the respective processing stations. Copending patent application by Norman B. Mears Ser. No. 433,950, supra, described an improved system for continuously moving the webbing through all of the processing stations thereby achieving a much better rate of mass production.

The television picture tube masks naturally must meet certain prescribed specifications or standards. Typically, a specification may require that the dot-like apertures pierce through the webbing in a circular pattern array having an outer diameter in the order of 17 inches and the apertures themselves may individually range in size from .0119 inch to .0150 inch diameter. There is generally also a requirement that the hole sizes vary in a somewhat gradual manner radially outward from the center of the array. Because of this it can be seen that light transmission through the mask will differ between its center and its outer periphery. Because the hole dimensions are so small, the allowable tolerances are, of course, very narrow. Additionally, the multitudinous holes can be visualized from the fact that center-to-center spacings of the holes is generally in the order of .0272 inch. It is not difficult to perceive then that slight variations in any of the various processing steps during the manufacture of these precision articles may and would likely cause the finished product to be outside the allowable tolerance range. Therefore, it is important that the finished articles be monitored by continuous inspection so that variations in the manufacturing process which tend to shift any of the dimensions outside of the allowable tolerance range will be immediately detected and proper remedial action can be initiated before any substantial quantity of masks have to be scrapped.

It is the general object of this invention to provide improved apparatus for automatic inspection of continuously moving precision articles.

More particularly, it is an object of this invention to provide apparatus for use in inspection testing continuously moving webbing after it has been at least partially processed.

Still another object of this invention is to provide automatic repetitive inspection testing of continuously moving processed webbing.

Yet a more specific object of this invention is to provide apparatus for use in automatic inspection testing of light transmission through perforated metallic webbing.

Still a further object of this invention is to provide apparatus for automatically positioning inspection testing devices to their proper testing locations for testing continuously moving webbing.

Yet another object of this invention is to achieve the immediately foregoing object and further to provide means for locking the testing devices to the moving webbing during the testing cycle to eliminate relative motion between the article being tested and the testing devices.

The preferred embodiment of this invention comprises a generally planar framework or carriage which carries a plurality of inspection testing devices such as lights and photosensitive cells. The plane of the carriage is generally parallel to the plane of the webbing under test and is arranged so that the testing devices are held in operative relationship to the webbing. As the webbing continuously moves longitudinally out of the processing station in a given plane, for example in a vertical plane and moving on edge, the carriage is automatically moved longitudinally and transversely (i.e., left and right and up and down) of the moving webbing as necessary to position the testing devices to their predetermined testing locations with respect to the area of the webbing which is to be tested. When so positioned, the carriage is then clamped onto the moving webbing allowing it to travel along with the webbing during which time the testing devices test the light transmission through the perforated webbing at the various testing sites in the perforated area. At the end of the test period, which is preset so that the carriage will travel only a certain distance with the webbing, the carriage is unclamped from the moving web and is again returned to another test location on the constantly moving webbing and the light transmission test repeated. The entire positioning and testing operation is continuously and automatically repeated. By controlling the clamping and releasing position of the carriage which carries the testing devices, sufficient freedom of movement is allowed so that the test device may be accurately positioned to the correct testing site. When the latter is reached, the carriage is held fixed with respect to the holes in the webbing which constitute the chosen test points.

These and other objects and features of this invention will become apparent during the following detailed description, with reference to the accompanying drawings in which.

Figure 1:
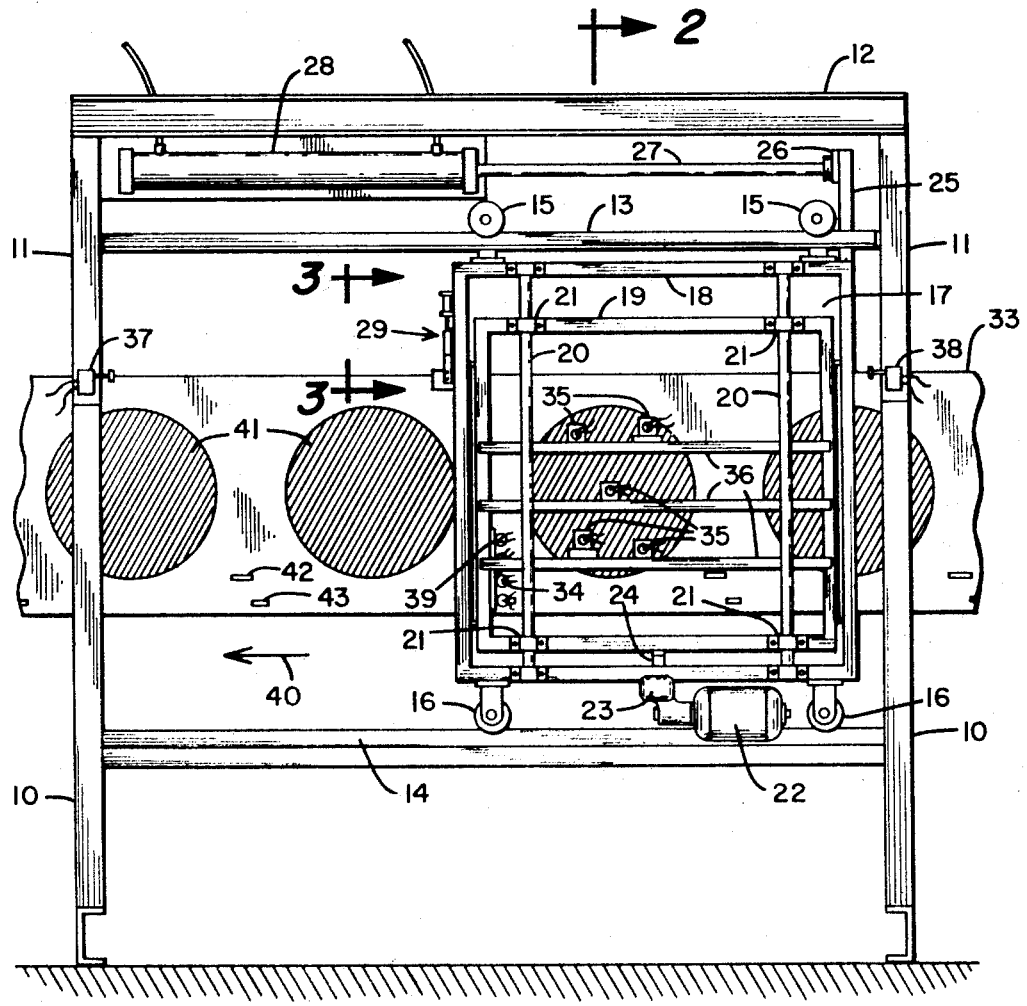
FIGURE 1 is a front elevational view showing the overall construction of a preferred embodiment of this invention.
Figure 2:
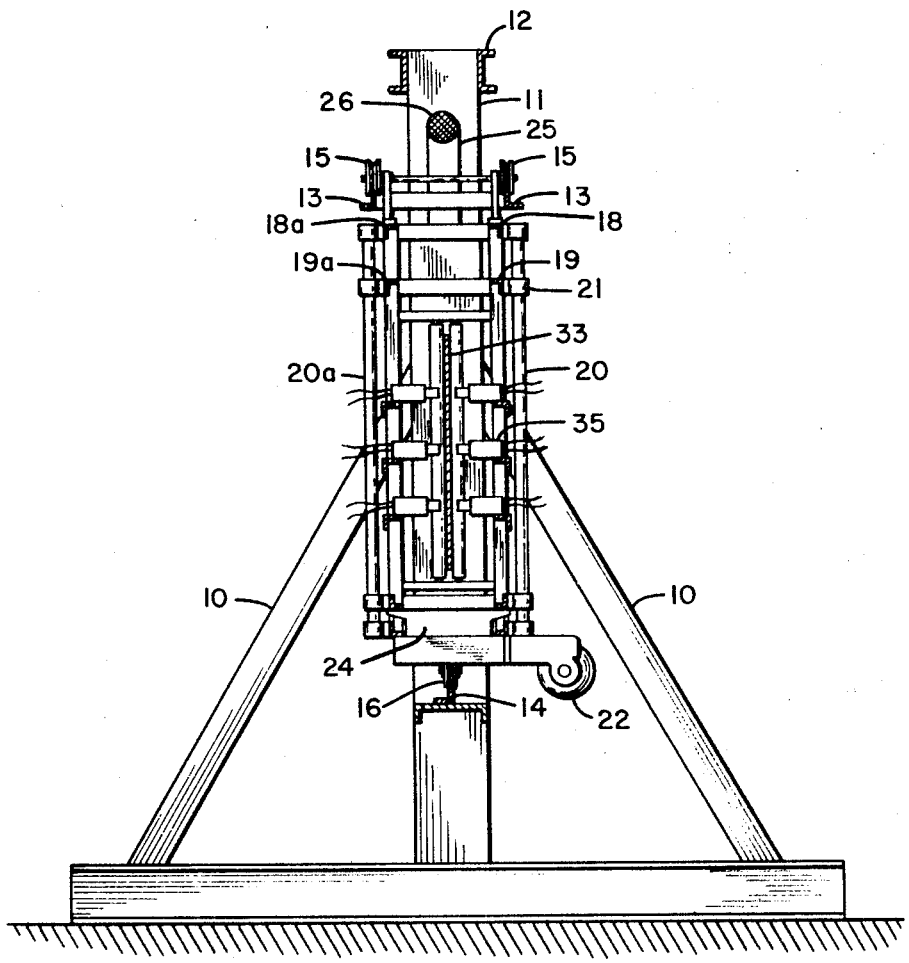
FIG. 2 is a side sectional view as seen along viewing line 2—2 of FIG. 1.

Referring now to FIGS. 1 and 2, an outer rigid main support consisting principally of bracing beams 10 along with suitable vertical side beams 11 and horizontal crossbeams 12 is anchored to the flooring in any convenient manner. Extending between the vertical side beams 11 are upper and lower horizontal tracks 13 and 14 respectively. Supported between the tracks 13 and 14 by a set of upper wheels 15 and a set of lower wheels 16 is a rectangular shaped carriage generally designated 17. The carriage 17 is actually made up of two separate parts, a first or outer rectangular frame 18 and a second or inner rectangular cage or frame 19. Actually, each of the frames 18 and 19 is in turn made up of two virtually identical sections, front and rear (right and left respectively as viewed in FIG. 2). The rear sections are conveniently designated 18a and 19a, respectively. Since the embodiment of this invention which is described in detail herein is used for testing light transmission through a perforated webbing, it can be appreciated that parts of the testing devices must be located on opposite sides of the webbing. Therefore, the necessity of having duplicate sections for the respective frames. Obviously, in those cases where the test devices need be located on only one side of the webbing, only a single section is required for frames 18 and 19. Hereafter, because the front and rear sections of the frames are virtually identical in construction, in general only the front section will be described in detail. Where it is important to refer to a corresponding part in the rear section, it will be identified by the letter a.

Fixedly attached in any convenient manner at their ends to the horizontal members of frame 18 are vertical guide rods 20. The horizontal members of the inner frame 19 contain sleeve bearings 21 which encircle the guide rods 20 and are slidable thereover. In this manner the inner frame 19 is slidably attached to the outer frame 18 so that the inner frame 19 can be suitably positioned vertically in its plane within the outer frame 18. An electric motor 22, which is bolted or otherwise rigidly attached to the outer frame 18 in any convenient manner, provides driving power for a gear box drive mechanism 23 which, in turn, raises and lowers a platform or rod 24 upon which the inner frame 19 sets, thereby providing the means for elevating and lowering said frame within the outer frame 18.

Extending upward from the right side of the outer frame 18 is an arm 25. The arm 25 has a pad area 26 which is arranged to engage the exposed end of piston 27 contained in a solenoid controlled air cylinder 28. The latter is suitably mounted to the outer main support. When the air cylinder 28 is in a first condition piston 27 is driven rightward to its furthest extended position. When the end of the piston is in contact with the pad area 26 on arm 25, it drives the carriage 17 rightward while the latter is supported by wheels 15 and 16 which ride along the tracks 13 and 14 respectively. This provides the mechanical means by which the carriage is positioned rightward to the desired testing location. When the air cylinder 28 is in a second condition, the piston 27 is retracted to its furthest leftward position.

Figure 3:
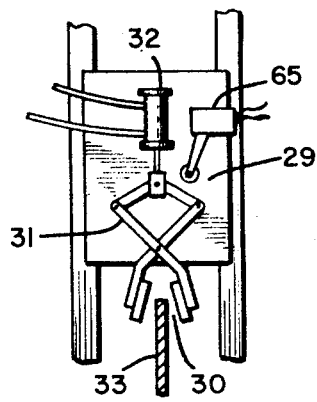
FIG. 3 is an enlarged view as seen along viewing line 3—3 of FIG. 1, showing in some detail the construction of the clamping device utilized in the preferred embodiment of the invention.

Mounted at the outer left side of the outer frame 18 is a clamp mechanism, generally designated 29, which is illustrated in greater detail in FIG. 3. The clamp shoes or jaws are controlled by lever linkages 31 which, in turn, respond to the condition of the double-action electrically controlled air cylinder 32. When the jaws 30 of the clamp are open as illustrated in FIG. 3, the carriage 17 is free to move in either direction along the tracks 13 and 14. However, when the jaws are closed they firmly grasp the webbing 33 so that the carriage 17 is carried along in the direction of travel of the webbing as it moves. This will be described later in more detail.

Attached at the lower left of the inner frame 19 is a set of three photo cells or electric eye devices 34a, 34b and 34c. The operational position of these devices with respect to the array 41 on the webbing 33 is shown in dashed lines in FIG. 4 and will be later described in greater detail. An additional set of five light sensing devices 35 are attached by cross bars 36 to the inner frame 19. This latter set of five units is used for the inspection testing of light transmission through the webbing 33 at specified sites in the array 41. The former set of three photocells 34 is used in the positioning of the inner frame 19 and outer frame 18 to properly locate the testing devices 35 with respect to the previously selected test positions on the webbing 33. Another photo cell 39 is a safety device. When a perforated area or array 41 passes over the cell 39 it becomes active to prevent the clamp mechanism 29 from energizing and clamping at a false location. Likewise it will prevent raising or lowering of the inner frame 19 which might otherwise result due to erroneous indications to cells 34a and 34b.

Attached to the left and right side vertical main support beams 11 are left and right limit switches 37 and 38 respectively. When the carriage 17 has reached a predetermined limit of leftward travel along the rails 13 and 14, the outer frame 18 will contact the plunger of the left limit switch 37, which can be considered to have three sets of contacts, to actuate it thereby denoting the limit of leftward travel. Similarly, the plunger of the limit switch 38 will be actuated when contacted by the outer frame 18 when the carriage 17 reaches its rightmost limit of travel.

The vertically oriented webbing travels from right to left continuously in the direction of arrow 40 from a source, not shown (which may be a processing station or a supply reel, etc.) to a take-up mechanism, likewise not shown (which may likewise be in the nature of part of a processing station or a take-up reel, etc.). The shaded areas 41 contained in the webbing 33 denote the etched-out or perforated areas which may constitute, for illustrative purposes, the array of a TV picture tube mask which can be manufactured from the metallic webbing. It is these shaded areas 41 which may be tested for light transmission characteristics in order to determine if the array pattern and the size of the apertures have been correctly etched out in the earlier processing steps. Because aperture sizes differ in various portions of the shaded array areas 41, the light transmission likewise will be different in various parts of the pattern array areas 41. Therefore, it is critical that the light transmission testing devices 35 be accurately located with respect to predetermined test locations in the shaded areas 41. Otherwise inaccurate readings could result.

The webbing 33 from which the TV masks are made may be sheets of stainless steel or 70–30 copper nickel or other metals which generally may be as thin as .006 inch and be 22 to 24 inches high (as viewed in FIG. 1). This invention can be used with a variety of webbing materials and the use of metallic webbing is only intended to be illustrative, not limitive. Likewise, no limitation is intended by the illustrative dimensions. The webbing 33 travels longitudinally continuously leftward in the direction of arrow 40 so that the carriage 17 must be properly positioned to locate the light testing devices 35 both in the longitudinal direction and laterally or transverse thereto in the vertical. The longitudinal positioning of carriage 17 is achieved by wheels 15 and 16 rolling along the tracks 13 and 14. The up and down or lateral positioning is achieved by sliding the inner frame 19 along the guide bars 20 under control of the positioning motor 22 and the gear box 23.

Figure 4:
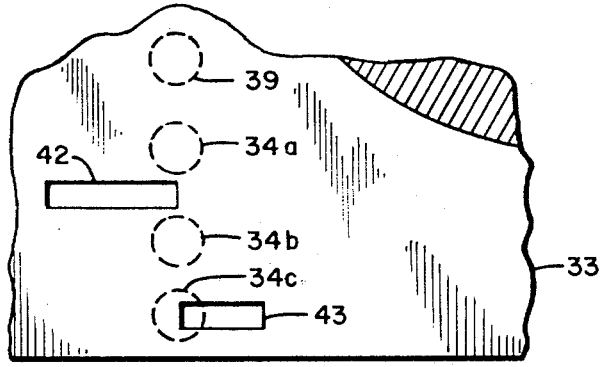
FIG. 4 is an enlarged portion of the webbing showing the relationship between the positioning indices carried by the webbing and the elements for sensing said indices.

Associated with each of the shaded array areas 41 and located outside to the lower left of each of said areas are rectangular index slots 42 and 43 which are etched out of the webbing 33 prior to the latter entering the testing location. These slots constitute positioning indices for use in positioning the carriage 17 and, correspondingly, the testing devices 35. As most clearly shown in FIG. 4, the two uppermost photocells or electric eyes 34a and 34b are associated with index slot 42 and control the vertical adjustment of the inner frame 19. The bottom electric eye 34c is associated with index slot 43 and controls the longitudinal positioning of the carriage 17. When the slot 42 is centered between the two upper photocells 34a and 34b, as illustrated in FIG. 4, the vertical or lateral position of the inner frame 19 is correct with respect to the array being tested denoted on all of the shaded areas 41. In a similar manner, when the bottom photocell 34c senses the leading or leftmost edge of slot 43, the testing devices 35 are correctly located longitudinally with respect to the corresponding shadow mask area 41. As described below in greater detail, suitable electrical circuitry is incorporated to properly control the drive motor 22 for the lateral or vertical adjustment and additional suitable electrical circuitry is provided to control the operation of the air cylinder 28 for the longitudinal or right and left positioning.

Figure 5:
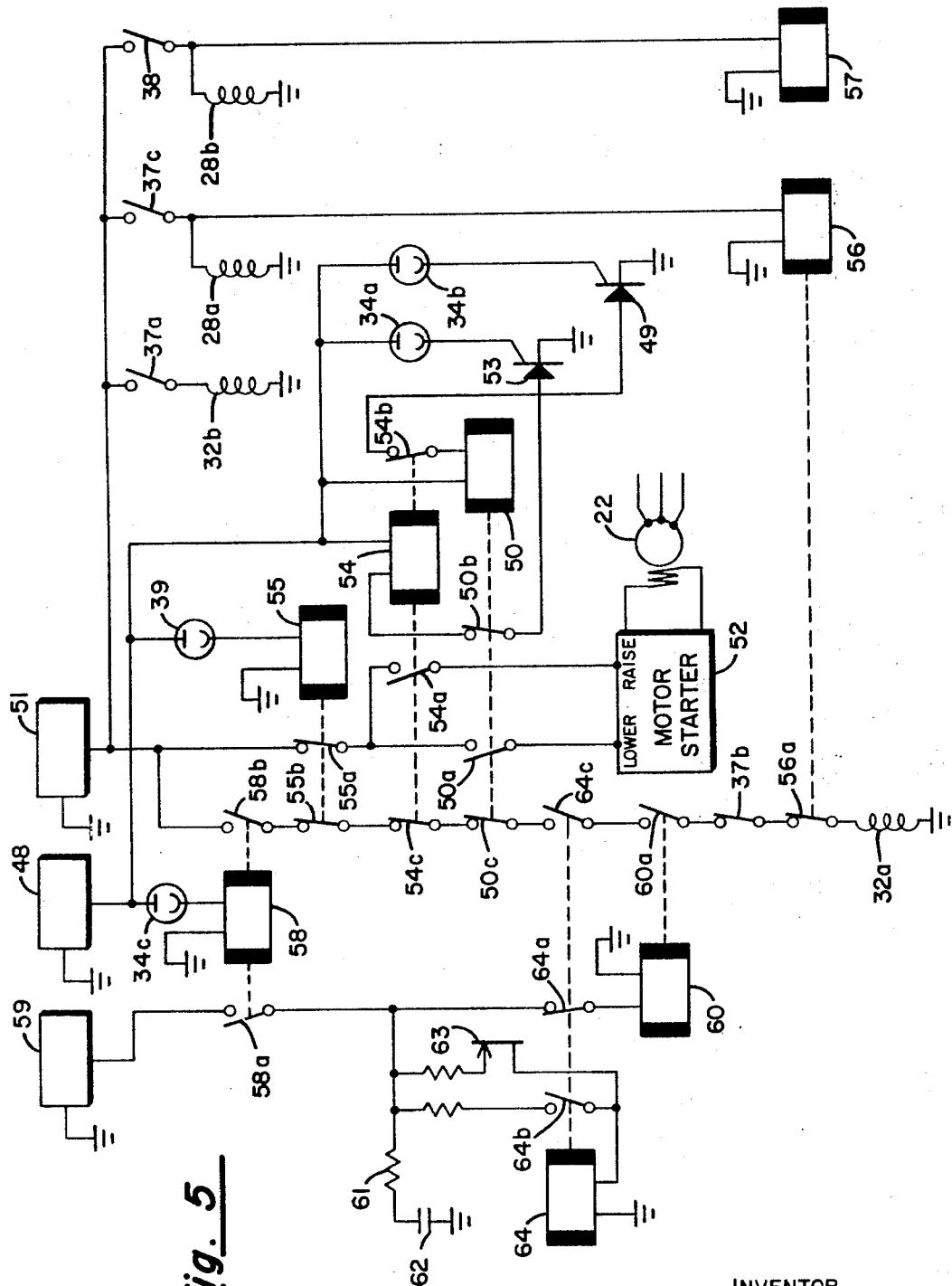
FIG. 5 is an electrical schematic of the main part of the electrical control circuits.

Referring now to the electrical control schematic diagram, all of the switches and relay contacts are shown in FIG. 5 in their normal condition, i.e., the condition they are in when the switch plungers are not depressed and the relay coils are not energized. Considering first the electrical control circuit for vertically or laterally positioning the inner frame 19 with respect to the moving webbing, a suitable energy source 48 is connected to one side of photocell 34b which, in turn, is connected to the switching control electrode of switching element 49. When sufficient light impinges on photocell 34b, enough current passes through it from source 48 to cause element 49 to switch to the "On" condition, thereby providing a low resistance path for current from the same source 48 to pass through and energize the coil of relay 50. This, in turn, closes the normally open contact 50a so that power is deliver from another energy source 51 to motor starter 52 which will start motor 22 in the proper direction to lower the inner frame 19 of carriage 17. The feeding of energy to the other input of motor starter 52 so that the motor 22 will drive in a direction to raise the inner frame 19 is achieved in a similar manner through the action of photocell 34a. When the latter photocell is struck by sufficient light it causes its associated switching element 53 to turn "On." This provides a low resistant path for current from energy source 48 to pass through and energize the coil of relay 54 so that normally open contact 54a is closed to provide power input to the proper side of the motor starter 52. An interlock arrangement is provided so that only one of the two coils 50 and 54 can be energized at any one time. The normally closed contact 50b of relay 50 is on the input side of the coil for relay 54 and similarly the normally closed contact 54b of relay 54 is in the input line to the coil of relay 50. The photocell 39 provides a safety feature so that when it is exposed to sufficient light intensity, relay 55 will be energized causing its normally closed contact 55a to open thereby opening the circuit to the motor starter 52 from energy source 51 to prevent the motor 22 from moving at all.

Next, considering the electrical control for the right and left or longitudinal positioning of the carriage 17, when the carriage 17 is at its leftmost position, the plunger of switch 37 is depressed causing normally open contact 37a to close to energize solenoid 32b thereby releasing or unclamping the clamp 29 from the webbing 33. At the same time, the normally open contact 37c is closed so that the solenoid coil 28a is energized from energy source 51 to advance or drive piston 27 of air cylinder 28 to the right. Solenoid 28a is constructed with an inherent delay or self-holding characteristic so that when initially energized it will not transfer air for approximately twelve seconds which is sufficient time to allow slot 43 to move beyond photocell 34c after which the carriage 17 is driven to its furthest rightward position. The closing of contact 37c also energizes relay 56 which has a mechanical locking or holding feature. When the carriage 17 is driven to its furthest rightmost position, the plunger of limit switch 38 is depressed thereby closing its normally open contact and energizing solenoid 28b which causes the air cylinder 28 to retract piston 27. The closing of switch 38 likewise energizes relay 57 which acts to release the mechanical holding mechanism of relay 56 in any convenient manner, not shown.

The determination of when the carriage is properly positioned longitudinally so that it can be clamped onto the moving webbing and the light transmission test can be initiated is under control of the photocell 34c. When light hits the latter with sufficient intensity, relay 58 will be energized from energy source 48 because of conduction through photocell 34c. The normally open contact 58a will then close thereby providing a path from energy source 59 to the coil of relay 60. An integrating circuit comprising resistor 61 and capacitor 62 delays the triggering of the unijunction element 63 but when the latter is triggered, relay 64 energizes which opens normally closed contact 64a thereby breaking the energizing circuit to the coil of relay 60. At the same time the normally open contact 64b is closed to provide a self-latching feature to hold relay 64 energized. When the light intensity on photocell 34c decreases below a certain threshold, relay 58 drops out so that contact 58a opens resulting in the drop out of relay 64 and resetting of conditions in the associated circuitry back to the initial state. It can be seen then that each time photocell 34c senses the slot 43 in the webbing 33, it will energize relay 60 and a short time thereafter relay 64. Energization of the latter, in turn, will cause the former to drop out so that relay 60 effectively is switched on and back off each time the photocell 34c senses a slot in the webbing. Relay 60 is a stepping relay and, in the instant illustration, can be considered as a three-step relay which closes its normally open contact 60a only once every third step. In other words, only at every third step of relay 60 will contact 60a close and it will remain closed only until the next following step of the relay. The integrating circuit of resistor 61 and capacitor 62 is included principally to prevent actuation of relays 60 and 64 by a momentary transient type of occurrence. For example, without this delaying circuit, a small hole in the webbing might be sufficient to cause relay 58 to be energized, at least momentarily, which would cause an erroneous stepping of relay 60 and the likelihood of a false test.

The conditions that the various switches and relay contacts have to meet before the frame will be clamped to the moving webbing can be observed by following the circuit path between the energy source 51 and the clamping solenoid 32a in FIG. 5. Relay 58 must be energized so that its normally open contact 58b will be closed. This means that photocell 34c must be sensing or detecting a slot 43. Relay 54 must be in the deenergized condition so that its normally closed contact 54c remains closed and relay 50 has to be in the deenergized condition so that its normally closed contact 50c likewise remains closed. This combined condition means that the frame is accurately positioned laterally up and down. Of course, normally open contact 60a must be closed indicating that stepping relay 60 has gone through three steps as earlier described and that the proper mask array or shaded area 41 is in position for test. Normally open contact 64c likewise must be closed to ensure that the stepping relay 60 has not been stepped into the third position by some transient, erroneous condition. As a further safety precaution, the normally closed contact 37b of the lefthand limit switch 37 must be closed thereby indicating that the frame is not at its leftmost position. Another safety precaution is that the normally closed contact 56a of relay 56 must be closed which ensures that the piston 27 is not being advanced rightward at the same time that the clamp is energized. The danger of clamping onto the webbing, which is moving leftward, at the same time that the carriage 17 is being driven rightward is apparent. Finally, normally closed contact 55b must be closed. This provides an additional safety feature to protect against clamping at an erroneous position with respect to the perforated mask. When all of the foregoing conditions have been satisfied, the power source 51 feeds energy to the clamping solenoid 32a to cause clamp 29 to grasp the moving webbing 33 firmly so that the carriage 17 is carried along by the wedding moving in the leftward direction. When the clamp 29 is thusly actuated, the linkage mechanism makes contact with the roller lever arm of switch 65 (FIG. 3) so that the latter, in turn, generates a signal indicating that the light transmission test by the various light cells 35 in the mask area 41 can be initiated.

Considering one complete cycle of operation of the apparatus, assume that a test is just being completed with the carriage 17 depressing the plunger of lefthanded limit switch 37. This opens the circuit to the clamp solenoid 32a, closes the circuit to unclamp solenoid 32b and further closes the circuit to solenoid 28a so that the piston 27 of air cylinder 28 is driven rightward. Light cells 34a and 34b will respond to the first slot 42 that they encounter in the moving webbing 33 and, if necessary, motor 22 will be energized through motor starter 52 to position the inner frame 19 vertically so that the test cells 35 will be properly located in their test position with respect to the associated first perforated TV mask array area 41. Light cell 34c will detect the first slot 43 in the webbing 33 that it encounters and will cause relay 60 to step via the action of relay 58. However, the normally open contact 60a will then be open and the carriage 17 will continue its rightward travel. The second set of slots 42 and 43 that the cells 34 encounter will result in further vertical positioning of the inner frame 19, if necessary, and will cause relay 60 to be stepped again but with no resulting change in the movement of the carriage 17 rightward. Light cells 34a and 34b will again respond to the third slot 42 and will control any needed vertical positioning of the frame, if required. But shortly before the advent of the third slot 43 into the sensing range of photocell 34c, the outer frame 18 contacts the plunger of the right hand limit switch 38 which closes the circuit to solenoid 28b to energize it so that the air cylinder 28 will retract the pisotn 27. At the same time the mechanically latched relay 56 will be unlatched by relay 57 being energized through switch 38. The normally closed contact 56a in the input line to clamp solenoid 32a will then close. When photocell 34c senses the third slot 43 that it encounters, all of the remaining conditions for energizing the clamping solenoid 32a are in the ready condition and when stepping relay 60 makes its third step to close its normally open contact 60a, the clamp solenoid 32a energizes and the clamp grasps the webbing 33. The light transmission tests are then initiated by the action of switch 65 and the test results are read and recorded or otherwise used in any desired manner. As described, the testing devices have then been brought into the accurate testing locations with respect to the moving webbing by the manipulations of the driving and positioning mechanisms, all under control of suitable electrical circuitry.

Although not shown herein in detail, in general the apparatus described would contain additional electrical control circuits and mechanical devices for manual operation of the apparatus. Furthermore, additional safety devices and features would normally be incorporated but are not shown. In practice the device may further include means for positioning the carriage beyond the range of the webbing so that the testing devices 35 can be periodically calibrated or repaired as the need arises. The foregoing have not been included for clarity since they are not considered part of the present invention, but it should be understood that they normally would constitute part of the construction of apparatus incorporating the instant invention. Further, although the invention has been described as used for testing every third article, it is apparent that suitable arrangements can be readily made to accommodate testing of any desired quantity of articles.

I claim:

1. Apparatus for use in testing webbing as it is continuously moving longitudinally out of a processing station, comprising:
   (a) a stationary main support;
   (b) a first frame parallel to the webbing mounted on said main support, said first frame being movable in a direction lengthwise of said webbing;
   (c) a second frame parallel to the webbing mounted within said first frame, said second frame being movable in its plane in a direction transverse of said webbing length;
   (d) a plurality of spaced-apart test devices fixedly attached to said second frame for being brought into operative testing relationship with respect to said webbing;
   (e) first sensing element on said second frame for scanning the moving webbing for a lengthwise position index carried by said webbing;
   (f) means operatively responsive to said first element for detachably clamping said first frame to the webbing when said index is sensed whereby said test devices are brought to the proper longitudinal test location with respect to said webbing;

(g) second sensing elements on said second frame for locating a transverse positioning index carried by said webbing; and (h) means operatively responsive to said second sensing element for moving said second frame transversely until said second frame is properly located with respect to said transverse positioning index and for at least temporarily holding said second frame at said transverse location, whereby said test devices are brought to the proper transverse testing location with respect to said webbing.

2. Apparatus for use in testing flat webbing as it is continuously moving longitudinally in a single direction, comprising:

(a) a stationary main support;

(b) a frame movably mounted in said main support in a plane substantially parallel to the plane of the webbing, said frame carrying test devices for being placed in operative testing relationship with respect to the webbing;

(c) driving means for moving said frame in its plane in a direction opposite that of the moving webbing when operatively enabled;

(d) sensing means attached to said frame for scanning the webbing as it moves past the frame for locating a longitudinal test position index carried by the webbing; and (e) means operatively responsive to said sensing means for disabling said driving means and for detachably clamping said frame to the moving webbing when said sensing means locates said longitudinal test potion index whereby said frame is moved in its plane by and with the moving webbing.

3. Apparatus as described in claim 2 further including:

(f) switching means mounted on said main support actuatable by said frame when the latter reaches a predetermined limit of travel with the webbing;

(g) said switching means enabling said frame driving means and detaching said clamping means when actuated.

4. Apparatus for use in testing flat webbing as it is continuously moving longitudinally in a single direction, comprising:

(a) a stationary main support;

(b) a first frame mounted to said main support substantially parallel to the plane of the webbing and movable longitudinally to the webbing;

(c) a second frame mounted within said first frame substantially parallel to the plane of the webbing and movable in its plane transversely to the travel of the webbing;

(d) said second frame containing a plurality of test devices in operative testing relationship to the webbing;

(e) sensing means mounted on said second frame for scanning the webbing for a locating index carried by the webbing;

(f) first driving means operatively controlled by said sensing means for positioning said second frame to a testing position in response to said sensing means detecting the locating index;

(g) second driving means for moving said first frame in a direction opposite that of the moving webbing when operatively enabled;

(h) means operatively responsive to said sensing means for disabling said second driving means and for detachably clamping said first frame to the webbing when said sensing means detects the locating index whereby the frames travel along with the moving webbing in the testing position;

(i) switching means mounted on said main support actuable by said first frame for unclamping the first frame from the webbing and for operatively enabling said second driving means when said frames reach a predetermined limit of travel with the webbing; and (j) means for energizing the testing devices before the frames reach the predetermined limit of travel with the webbing.

5. Apparatus as in claim 1 further including:

(a) driving means for moving the first frame in its plane opposite to the direction of travel of the webbing when operatively energized; and (b) means operatively responsive to said first sensing means for de-energizing said driving means when said first sensing means detects said lengthwise positioning index.

6. Apparatus as in claim 5 further including:

(a) switching means fixedly located on said main support downstream of the direction of travel of the webbing, said switching means being actuated by the first frame reaching a predetermined limit of travel with the webbing; and (b) means operatively responsive to said switching means for energizing said driving means and for detaching said clamping means from the webbing when said switching means is actuated.

References Cited

UNITED STATES PATENTS

| | | | |
|---|---|---|---|
| 2,184,159 | 12/1939 | Stockbarger et al. | 250—235 X |
| 2,479,293 | 8/1949 | Bayless | 250—234 X |
| 2,720,146 | 10/1955 | Mears | 95—73 |
| 2,747,456 | 5/1956 | Waller et al. | 250—234 |

JAMES W. LAWRENCE, Primary Examiner

V. LAFRANCHI, Assistant Examiner

U.S. Cl. X.R.

250—219, 220